J. S. HALL.

SHORT-THREAD SEWING-MACHINE.

Reissued July 18, 1876.

No. 7,225.

Witnesses

Geo. H. Strong.

John. L. Boone

Inventor

John. S. Hall by Dewey & Co.

Attys.

N. PETERS, PHOTO-LITHOGRAPHER, WASHINGTON, D. C.

UNITED STATES PATENT OFFICE.

JOHN S. HALL, OF SAN FRANCISCO, CAL., ASSIGNOR TO JOHN L. BOONE.

IMPROVEMENT IN SHORT-THREAD SEWING-MACHINES.

Specification forming part of Letters Patent No. 168,637, dated October 11, 1875; reissue No. 7,225, dated July 18, 1876; application filed February 15, 1876.

*To all whom it may concern:*

Be it known that I, JOHN S. HALL, of San Francisco city and county, State of California, have invented an Improvement in Short-Thread Sewing-Machines; and I do hereby declare the following description and accompanying drawings are sufficient to enable any person skilled in the art or science to which it most nearly appertains to make and use my said invention or improvement without further invention or experiment.

My invention relates to a sewing-machine for doing that class of work which is known as overseaming, the peculiarity of which is that the stitch, instead of being made by two threads in a direct line along the edge of the cloth or material which is being sewed, is made with a single thread, first through the cloth and then over the edge, so as to form what is known as a whipping or overseaming stitch.

The chief novelty in my sewing-machine consists in operating an independent needle by means of punches, which force it through the material, and then back again outside of the material. Each punch is withdrawn from the needle after pushing it in either direction, so as to leave an opening through which the cloth can pass after each movement of the needle. The frame in which the needle and punches are operated has a reciprocating motion back and forth, which carries the needle forward, so as to pass through the cloth on its downward passage, and back when it rises, so that the thread is carried over and through the edge of the material at each revolution of the driving-shaft.

In order to more fully illustrate and explain my invention, reference is had to the accompanying drawings, forming a part of this specification, in which—

Figure 1:
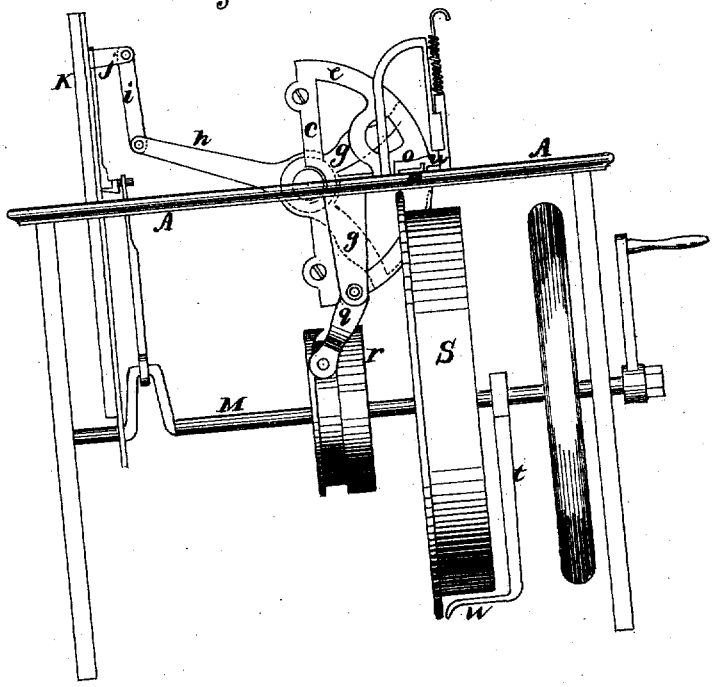
Figure 2:
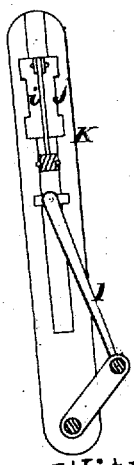
Figure 3:
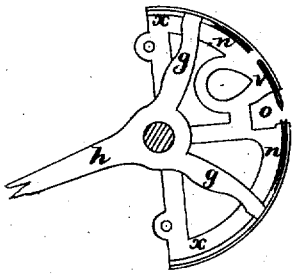
Figure 4:
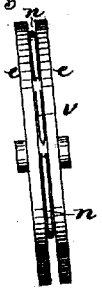

Figure 1 is a side elevation of my machine. Fig. 2 is a front view of the slide and guide with the connecting rod and crank. Fig. 3 is a sectional view of the needle-guide, showing the needle and punches. Fig. 4 is a front view of the same.

A is the table of a sewing-machine. A slot, B, is made lengthwise through the middle of the table, in which the needle-frame C moves, being supported by a slide upon each side of the slot, and operated by suitable mechanism from the driving-shaft M. This frame may be circular or straight, as desired, but in either case the motion and operation of the frame are similar. This frame consists of two metal plates, *e e*, placed close together, so as to leave a narrow space between them, and which are secured together at a single central point, *f*, which point also serves as a center for the operating-arms *g g*. This frame extends equally above and below the table, as shown. The operating arms *g g* are simply thin metal strips, capable of moving in the space between the plates *e e*, one of which extends upward and the other downward. These arms are operated by a lever, *h*, the opposite end of which is connected by a link, *i*, with a slide, *j*. This slide is moved up and down in ways formed in an upright plate, K, by a pitman, *l*, from a crank on the main driving-shaft M of the machine. Now, when the shaft M is turned, the arms *g g* are caused to move forward and back between the plates alternately. Each arm carries a punch, *n*, at its extremity, and this punch moves in a way or groove, X, formed in the outer edges of the plates *e e*. The needle V which I use is made somewhat flat, having an oval section so that it will move with its opposite flattened edges in the grooves in the plates *e e*, between the punches of the two arms *g g*. The frame C has a recess, O, directly opposite the cloth-plate P and feed of the machine, across which the needle passes in making a stitch, and the frame is moved forward and back at each revolution of the driving-shaft M by a pivoted lever, *q*, which is operated by a cam-groove in the face of a pulley or wheel, *r*, which is secured to the driving-shaft below the frame. This lever throws the frame forward so as to allow the needle to pass through the work, and is withdrawn or retracted after the needle has passed through to the under side of the work. Directly below the feed-plate a large wheel, S, is secured to the under side of the table, so that the shaft M will pass through a hole in its center, and an arm, *t*, is firmly secured to the shaft beside the wheel. This arm extends out to the periphery of the wheel, where it is bent across the face of the wheel, and formed into a hook, W, as shown, and serves by its revolution to draw the slack or free end of the thread entirely through the cloth after each passage of the needle through the cloth.

In sewing with this machine, a length of thread equal to the circumference of the wheel S is taken, and one end placed through the eye of the needle in the usual way of threading needles. The opposite end of the thread is then tied into a knot, and the knot drawn up close to the needle, while the other end is free. The two edges of the material to be sewed, having been placed under the presser-foot, *u*, in the usual way, and the shaft M set in motion, the first movement of the frame C is forward, so as to bring the edge of the cloth in the recesses of the frame. The upper arm *g* then moves downward so as to cause its punch *n* to force the needle down through the cloth. The upper arm *g* then moves back, leaving the needle below the cloth. The frame C then moves back to its first position, and at the same time the hook on the end of the arm *t* catches the free end of the thread, and draws it out around the wheel S, while the lower punch *n* is made to force the needle back to the proper position to take another stitch. Thus the needle is alternately pushed down through the cloth, and after the frame is retracted pushed up again to its first position, carrying the thread around over the edge of the cloth with it, while the hook draws the slack or length of the thread through the cloth as it passes around the wheel S. The length of thread to be used must be governed by the circumference of the wheel S, as it is necessary that the hook shall withdraw the entire length at each revolution. Either a straight or curved needle can be used in this class of sewing-machines, the manner of making the stitch being the same in either case. By this means I provide a sewing-machine by means of which overseaming or whipping can be done with great facility, and in the same manner that the hand overseam-work is done.

Having thus described my invention, what I claim, and desire to secure by Letters Patent, is—

1. In an overseaming sewing-machine, the combination of a loose needle, an inclosing-guide, and punches to drive said needle, substantially for the purpose set forth.

2. The independent needle V and punches *n n*, in combination with the frame C, having a needle-guide and operating mechanism whereby a reciprocating motion is imparted to said frame, substantially as described.

3. The combination, with the frame C, having the recess *o* opposite the cloth-plate, and provided with a needle-guide or containing-groove, X, along its edge, constructed and arranged substantially as described, of operating mechanism for imparting to said frame a reciprocating movement whereby the needle in passing across the recess will in one direction only pass through the goods to be sewed, as set forth.

4. The reciprocating frame C, with its recess *o*, and having the opposite ways or grooves X, in combination with the arms *g g*, with their punches *n*, and the independent needle V, substantially as and for the purpose above described.

5. The cam-wheel *r* and pivoted lever *q*, in combination with the reciprocating needle-frame C, substantially as and for the purpose above described.

6. The stationary vertical wheel S and revolving arm *t* with its hooked end *w* bent, as described, in combination with the independent needle V, punches *n n*, and reciprocating frame C, substantially as and for the purpose above described.

JOHN S. HALL.

Witnesses:
J. R. LEWIS,
LOUIS WOLTER.